United States Patent [19]

Kilian

[11] Patent Number: 4,633,231
[45] Date of Patent: Dec. 30, 1986

[54] MONITORING ARRANGEMENT

[75] Inventor: Ernst A. Kilian, Bremen, Fed. Rep. of Germany

[73] Assignee: U.S. Philips Corporation, New York, N.Y.

[21] Appl. No.: 706,078

[22] Filed: Feb. 27, 1985

[30] Foreign Application Priority Data

Feb. 29, 1984 [DE] Fed. Rep. of Germany ....... 3407345

[51] Int. Cl.$^4$ .......................... G08B 1/08; H04Q 7/00
[52] U.S. Cl. .................................... 340/539; 340/307; 340/309.15; 455/95
[58] Field of Search ........ 340/539, 531, 536, 571-573, 340/825.46, 306, 307, 309.15, 309.3; 455/67, 89, 90, 95, 100, 127, 128

[56] References Cited

U.S. PATENT DOCUMENTS 3,763,488 10/1973 Klasing ............................ 340/309.15
4,157,540 6/1979 Oros ................................... 340/307
4,331,953 5/1982 Blevins et al. ...................... 340/539

Primary Examiner—Donnie L. Crosland
Attorney, Agent, or Firm—Robert T. Mayer; Bernard Franzblau

[57] ABSTRACT

Apparatus for monitoring the time duration in which a visitor remains in a defined region on the way from a visited place to another place, more particularly from the entry to the visited place and back, freely and without supervision. At the entry place, the visitor receives a transmitter with a timing member. After termination of a given time duration which corresponds to the normal travelling time of the visitor between the visited places, the transmitter transmits an individual identification signal which is received by a central receiver and is decoded. It can be immediately ascertained which visitor dwells for too long a time within the defined region so that searching or controlling measures can be initiated.

16 Claims, 2 Drawing Figures

MONITORING ARRANGEMENT

This invention relates to an arrangement for monitoring the time period in which a person remains in a given closed region.

In larger closed regions, such as factories or office buildings, with widely separated places of destination for suppliers and visitors, it is necessary to maintain control of the time in which the non-employee is present on the factory grounds without supervision in order to prevent the non-employee from engaging in undesired actions, such as especially industrial espionage. A possibility would be to send a message from the entrance gate, to which every non-employee has to report, to the place of destination that a visitor is under way and when this visitor is due to arrive. In the case of a large number of visitors, this is very laborious and unreliable, however, and when the visitor is late his whereabouts cannot be ascertained without further expedients.

The invention has for an object to provide an arrangement of the kind mentioned in the opening paragraph by which it can be ascertained at at least one central station when a visitor has exceeded a given time corresponding to a normal travelling time from an entry point to a place of destination.

According to the invention, this object is achieved by the use of a transmitter to be carried along by the person to be monitored. The transmitter is adapted to transmit electromagnetic energy and comprises an energy storage device (energy source) and a timing member which, when the transmitter is handed to the monitored person, is adjusted to a desired time duration. After termination of this time duration, which starts at the instant of handing-over the transmitter, the timing member drives a transmitter stage to transmit a given information signal. At least one receiver is provided which, upon reception of the transmitted given information signal, activates an indication device.

U.S. Pat. No. 4,331,953 discloses a system by means of which persons can be monitored during dangerous work. Each of these persons then carries a transmitter with a control key. Before termination of the given time a control key should be operated by the monitored person. This causes the transmitter to transmit an information signal to a central station. In this central station the time duration between two successive information signals of each transmitter are monitored, and when this time duration is exceeded, an alarm is supplied in order to ascertain whether the person carrying the corresponding transmitter has met with an accident. In this known system, the cooperation of the person carrying the transmitter is necessary. However, such cooperation should not be required, or expected from a non-employee. In fact, it should even be excluded.

On the contrary, it is ascertained in a reliable manner by the arrangement according to the invention whether a non-employee exceeds a given anticipated travelling time between two places to be called on, more particularly from an entry point to a place of destination or back, without this person having to cooperate and even without the necessity of informing him of the fact that he is being monitored.

In general, in a larger region, one has to take into account the fact that several visitors are simultaneously under way to possibly different destination points. In order to be able to recognize more rapidly upon indication of an exceeded travelling time which visitor has exceeded the time given for his travel, it is efficacious that the given information signal transmitted by the transmitter be an identification signal in digital or analogue form associated individually with the transmitter and modulated onto a carrier frequency. Thus, the given information signals of different transmitters can readily be distinguished in the receiver and on the indication device.

In order to remind a visitor who is late unintentionally and without malice of the fact that he exceeded the expected travelling time to his place of destination, it is efficacious that the transmitter comprises, in addition, a device for supplying a sensorily perceptible information signal upon termination of the adjusted time duration. This information signal can be an acoustic signal, such as a warning tone, or an optical signal, such as a blinking light source. The sensorily perceptible information signal is moreover an indication to employees who are close to the visitor that a visitor is present who dwells between two places to be called on for a longer time than was expected. Upon the occurrence of the sensorily perceptible information signal supplied by his transmitter, the visitor then has the option to hurry to the place of destination so that he can reach it before measures for finding him are initiated on account of his belated arrival.

In order that the transmitter to be handed to the person can be more readily manipulated, and to avoid operating errors as far as possible, it is efficacious that at the area at which the transmitter is handed over a container for these transmitters be provided. The container has electrical contacts which, when the transmitter is inserted, are electrically connected to electrical contacts on the transmitter and replenish the energy storage of the trasmitter and which automatically start the timing member when the electrical connection is interrupted. As a result, the guard need only take a transmitter from the container and hand it to the visitor, all functions then being automatically activated. As the case may be, before taking the transmitter from the container, the place of destination to be called on by the visitor may be fed to it and the time duration of the timing member may automatically be individually adjusted thereto.

After the visitor has reached his destination, or after he has returned to the entrance gate, the timing member in the transmitter would continue to operate and would reach the adjusted time duration, as a result of which the information signal would be supplied. In order to avoid this problem, it is efficacious that upon insertion of the transmitter into the container, the timing member be set automatically to a rest position. This means that a container for transmitting is required not only at the entrance gate, but also at every destination point.

Further embodiments of the invention are outlined in the dependent claims.

In order that the invention may be readily understood, it will now be described more fully, by way of example, with reference to the accompanying drawing, in which.

Figure 1:
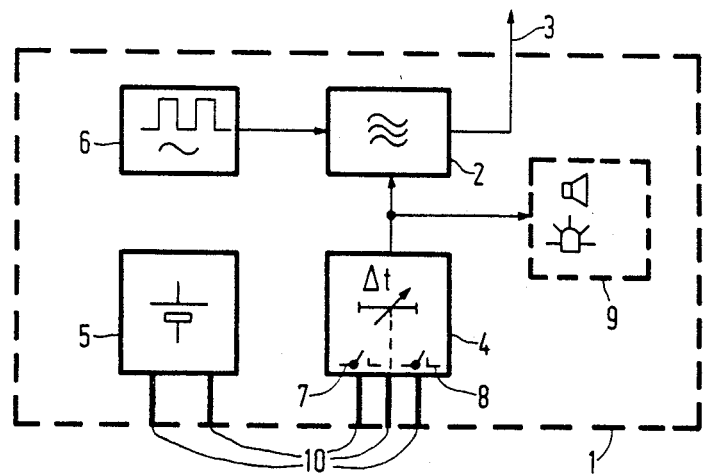
FIG. 1 shows a block circuit diagram of a transmitter.

In FIG. 1, the transmitter 1 comprises a transmitter stage 2 having an output connected to an aerial 3. This aerial 3 can be constructed in different ways, for example as a notch aerial, or it can be integrated into the housing of the transmitter 1 so that it is not visible from the outside. Such constructions of aerials are known per se.

The transmitter stage 2 is normally in the rest position and is made operative only by a signal from a timing stage 4. The transmitter stage 2 produces a carrier frequency which is modulated by a signal produced by a generator 6. This modulation may be, for example, a given frequency in the low-frequency range, or the transmitter stage 2 may be controlled by the generator 6 in a manner such that a given binary word is contained in the signal emitted via the aerial 3.

By means of the output signal of the timing member 4, an optionally present device 9 may also be driven to produce an acoustic or optical signal outside the transmitter. The timing member 4 is started by a switch 7, as a result of which after termination of the adjusted time duration $\Delta t$ an output signal is produced. This output signal is supplied to the transmitter stage 2 and, as the case may be, to the device 9. By means of a further switch 8, the timing member 4 can be reset to the starting position. The time duration $\Delta t$ of the timing member can either be fixedly adjusted or be adjustable from the outside. This adjustment is effected, like the actuation of the switches 7 and 8, via contacts 10 which lead to the outside of the transmitter 1 and to which corresponding signals can be applied. Furthermore, an energy supply source 5 in the form of a battery is provided, which supplies electrical energy to the transmitter stage 2, the timing member 4, the generator 6 and, as the case may be, the device 9. The energy source is also connected to contacts 10 which lead to the outside of the transmitter 1 and through which electrical energy can be supplied to the battery 5 from the outside.

The transmitter 1 can be mounted in a small housing because only a low transmission energy is required if several receiving aerials are arranged at different locations on the factory grounds or in the office building so that the distance between the transmitter and a receiving aerial does not exceed a given value. When constructed as an integrated circuit, the transmitter 1 may also be incorporated in an identification card of the kind frequently used nowadays. The visitor fixes this card in a visible manner to his cloths so as to distinguish him from employees and to enable these employees to identify him as a visitor.

On the other hand, the transmitter 1 may also be incorporated in a housing which is provided with fixing means, such as adhesion magnets or suction cups, so that the housing can be readily secured to automobiles. Such a housing may be made of a soft synthetic material or of rubber. When a transmitter is arranged on an automobile, the latter is monitored independently of the driver, who may receive a further transmitter to be fixed to his clothes.

Essentially, the housings may be formed so that a visitor who is not familiar with such devices does not perceive that an electronic circuit is contained therein.

If it is feared that visitors will damage or destroy the transmitter with malice in order to prevent the warning signal from being transmitted after termination of the adjusted time duration, it may also be efficacious to arrange that the transmitter stage 2 emit a differently modulated signal before termination of the time duration of the timing member 4 at given distances to indicate that the transmitter is still operative. In case this other signal is then received no longer, a searching action for the relevant visitor can be started dependent upon the receiving aerial which last received a signal from the transmitter. It is clear that in order to prevent the visitor from manipulating the transmitter, the contacts 10 should be provided so as not to be clearly visible and not readily accessible. The switches 7 and 8 may also be actuated in a different manner, for example by external magnets applied in a given manner. This may be effected automatically in the container 17, which is shown in FIG. 2.

The container 17 is provided with openings 18 into each of which a transmitter can be inserted. Electrical contacts are arranged in these openings 18 in a manner such that upon insertion of a transmitter they are conductively connected to its electrical contacts 10. As a result, a transmitter inserted into an opening 18 of the container 17 is automatically held in the rest position in that the switch 8 is closed and the switch 7 is opened. At the same time, the energy source 5 is charged. Furthermore, the time duration $\Delta t$ of each transmitter can be individually adjusted through operating members 19, preferably in dependence upon the desired place of destination. The switch 7 can be constructed so that, when the transmitter is taken from the container 17 or when it is fixed to the clothes of the visitor or to an automobile, the timing member 4 is automatically started.

Figure 2:
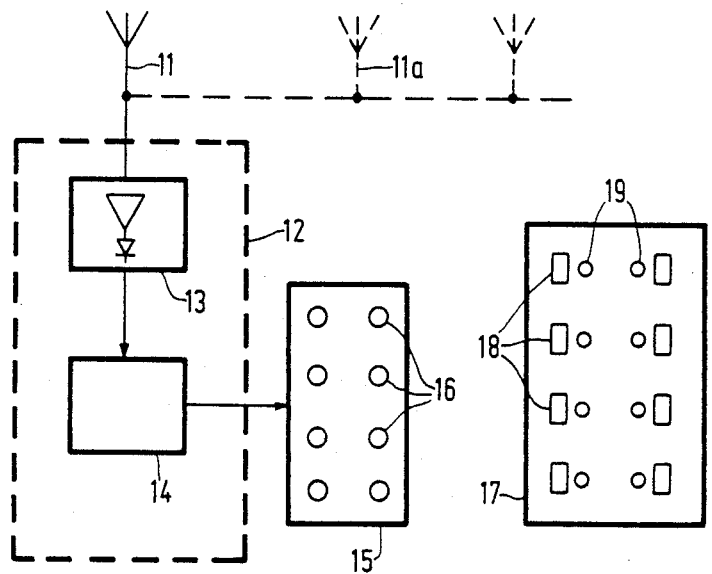
FIG. 2 shows a block circuit diagram of a receiver with an indication device and a container.

The receiver shown in FIG. 2 has a number of aerials 11, 11a etc., which are arranged so as to be spatially separated and are efficaciously arranged spatially in such a manner that from arbitrary places on the factory grounds the largest distance from the closest aerial does not exceed a given value.

The aerials 11, 11a etc. lead, as the case may be via amplifiers and/or converters, to a receiver 12, which has a receiver amplifier with a demodulator 13. At the output of the latter there appears a signal corresponding to the signal which is produced by the generator 6 in a transmitter and which is supplied to a decoder 14. The latter decodes the demodulated receiver signal to determine which transmitter emits an identification signal. The decoder drives, by means of the decoded signals, an indication device 15 which has an indicator lamp 16 for each transmitter present. Upon termination of the adjusted time duration in the timing member contained in a transmitter, the transmitter emits its associated identification signal. The corresponding indicator lamp 16 lights up so that it can immediately be ascertained which visitor dwells inside the factory ground for a longer time than expected.

In order to be able to rapidly determine the location of the visitor, it is efficacious to use, in addition, a receiver which may be portable and is provided with a sounding aerial.

What is claimed is:

1. An apparatus for monitoring the time duration of a person within a given closed region comprising: a portable transmitter assembly to be carried by the person to be monitored for emitting electromagnetic energy and comprising, an energy source, a timing member which, when the transmitter is handed to the person at a first point, is adjusted to a given time duration determined by the normal travel time between said first point and a second point, said timing member being operative, after termination of the adjusted time duration, to energize a transmitter stage to transmit a given information signal, and at least one receiver which, when the transmitted given information signal is received, activates an indication device.

2. An apparatus as claimed in claim 1, characterized in that the given information signal transmitted by the transmitter comprises an identification signal in digital or analogue form associated individually with the transmitter and modulated onto a carrier frequency signal.

3. An apparatus as claimed in claim 1 wherein the transmitter assembly further comprises a device controlled by the timing member for supplying a sensorily perceptible information signal at the end of the adjusted time duration.

4. An apparatus as claimed in claim 1, characterized in that at the first point at which the transmitter assembly is handed over there is provided a container for transmitters, said container having electrical contacts which, upon insertion of the transmitter assembly into the container are electrically connected to corresponding contacts on the transmitter assembly so as to supply energy to the energy source of the transmitter assembly and which automatically start the timing member when the electrical connection is interrupted.

5. An apparatus as claimed in claim 4, characterized in that upon insertion of the transmitter assembly into the container the timing member is set automatically to a rest position.

6. An apparatus as claimed in claim 1 wherein an aerial of the transmitter is integrated in a housing of the transmitter assembly.

7. An apparatus as claimed in claim 1 wherein the transmitter assembly comprises a flat card to be fixed to the clothes of the person.

8. An apparatus as claimed in claim 1 wherein the transmitter assembly is incorporated in a housing which has fixing means, such as adhesion magnets or suction cups, for attachment to an automobile.

9. An apparatus as claimed in claim 2, characterized in that the indication device has several indication elements each of which is associated with one of several transmitters (1).

10. An apparatus as claimed in claim 1 wherein the receiver comprises several spatially separated aerials.

11. A portable wireless transmitter assembly for use in a system for monitoring the time in which a person is present within a protected region, said system including a portable radio transmitter to be carried by the monitored person and a central receiver remote from the transmitter and responsive to an electric signal transmitted by the radio transmitter, said portable wireless transmitter assembly comprising: a radio transmitter for transmitting a given information signal, an adjustable timing member for activating the radio transmitter after a predetermined time period adjusted at a first location where the portable transmitter assembly is received by the monitored person, said adjusted time period being determined by the normal travel time of a person between said first location and a second location within said protected region, and a self-contained energy source for supplying electric energy to said radio transmitter and to said timing member.

12. A transmitter assembly as claimed in claim 11 wherein said timing member is arranged to activate the radio transmitter at the end of an adjusted predetermined time period independently of any manual control by the monitored person.

13. A transmitter assembly as claimed in claim 11 further comprising a signal device activated by the timing member for supplying a sensorily perceptible signal, said timing member activating the radio transmitter before or at the same time as the signal device.

14. A transmitter assembly as claimed in claim 11 further comprising a housing for the transmitter assembly arranged to prevent any manual control of the transmitter assembly by a monitored person carrying said transmitter assembly.

15. A transmitter assembly as claimed in claim 11 devoid of any switches for controlling the activation of the timing member that are accessible to a monitored person.

16. A transmitter assembly as claimed in claim 11 further comprising a container for the transmitter assembly, said container and transmitter assembly having mating contacts which together establish an electric connection operative to maintain the timing member in an initial state when the transmitter assembly is in the container and which, when the transmitter assembly is removed from the container, interrupts the electric connection to automatically start the timing member.

* * * * *